(No Model.)

W. HEWITT.
CULTIVATOR.

No. 496,605. Patented May 2, 1893.

Witnesses
A. Edmunds
S. McBain

Inventor
William Hewitt
By P. J. Edmunds
Att'y

UNITED STATES PATENT OFFICE.

WILLIAM HEWITT, OF BRANTFORD, CANADA.

CULTIVATOR.

SPECIFICATION forming part of Letters Patent No. 496,605, dated May 2, 1893.

Application filed September 21, 1892. Serial No. 446,475. (No model.)

*To all whom it may concern:*

Be it known that I, WILLIAM HEWITT, a subject of the Queen of Great Britain, and a resident of the city of Brantford, in the Province of Ontario, Canada, have invented certain new and useful Improvements in Cultivators, of which the following specification, taken in connection with the accompanying drawings, forms a full, clear, and exact description.

This invention relates to improvements on an implement for breaking and stirring the soil, and otherwise preparing it to receive seed. And these improvements consist of a combined pivotal and pressure cross beam, which permits the teeth to adapt themselves automatically to uneven or inclined land; of guides or guards to hold the teeth in place, and of a tooth and connections, and of the improved construction and combination of parts of the same, all of which will be hereinafter first fully set forth and described, and then pointed out in the claims.

Figure 3:
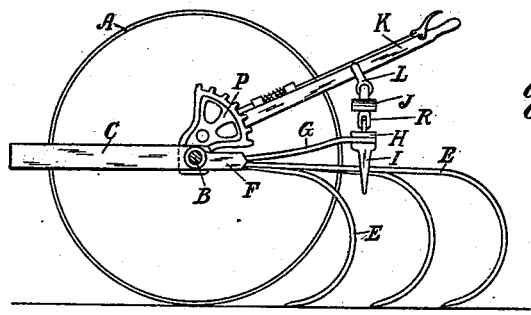
Figure 1:
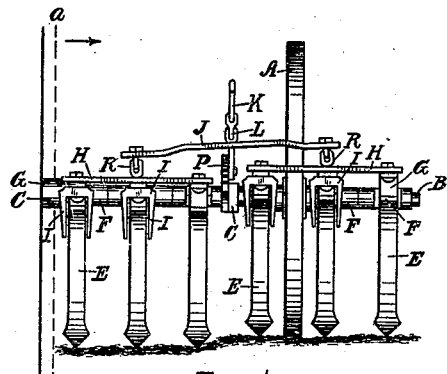
Figures 4, 5, 6:
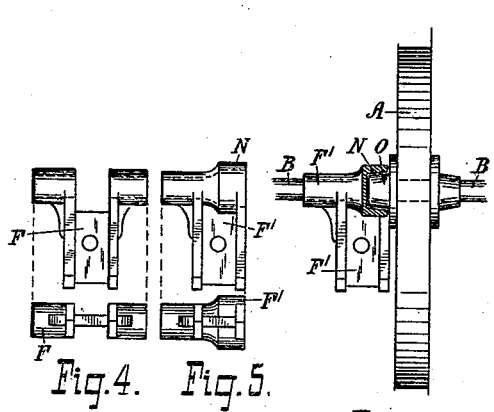
Figure 2:
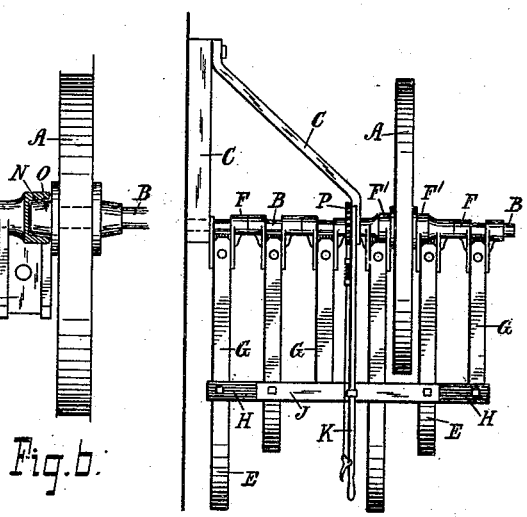

Reference being had to the accompanying drawings, Figure 1. is a rear view of a portion of a sulky cultivator embodying my invention. Fig. 2. is a plan view of Fig. 1. Fig. 3. is a cross sectional view of the machine, on the line, $a$, $a$, of Fig. 1. Fig. 4. is an enlarged detail plan, and end view of one of the couplings, which couples the tooth and spring with its pivotal support or axle. Fig. 5. is an enlarged detail plan and end view of a modification of one of these couplings, which is placed adjacent to the wheel to receive the hub thereof. Fig. 6. is an enlarged detail plan view of a portion of the wheel, and one of the couplings adjacent thereto, the latter being shown partly in section.

These improvements will be particularly described with reference to the accompanying drawings, wherein, A, A, designate the wheels; B, the axle; and, C, the frame of the machine, which axle, B, forms a pivotal support for the teeth, E.

F, F, are couplings, pivotally secured to the axle or spindle, B, to each of which couplings, one end of a tooth E, is secured. The couplings, F', adjacent to the wheels, A, are formed with an enlarged socket, N, as shown in Fig. 6, or with a socket larger than the axle, B; into this socket, N, the end of the hub, O, is inserted; when these couplings are constructed as described, and placed in position, they not only form a sand band, which prevents the sand, &c., from getting in between the hub, O, and the adjacent coupling, but permit the couplings to be sufficiently close to the wheel, A, to retain the same proportionate distance between the teeth, at the same time, permit the wheels to be placed on, and operate at any point on the axle, B, between said teeth, E.

G, G, are springs, one of which is secured at one end to each coupling, F, or, F', the other end extends backward on a line with the tooth, and to two or more of these springs, G, the cross bar, H, is attached, so that a series of two or more of said springs, G, as well as the teeth, E, connected therewith, will move, or be acted upon simultaneously by the combined pressure and pivotal cross beam, J. And secured to these springs, G, and cross bars, H, are the forked guards or guides, I, which are adjusted to clasp the longest of the graduated teeth, E, as shown in Figs. 1, and 3, and the longest of the teeth, E, are clasped by these guards or guides, I, so that when said teeth are being pressed into the ground, or moving through the soil, they will be kept from moving to either side.

J, designates a cross beam, pivotally secured to the cross bars, H, by the link coupling, R, and to this cross beam, J, the lever, K, is secured, by the coupling link, L. The front end of this lever, K, is pivotally secured to the toothed segment, P.

P, is a toothed segment, rigidly secured to the frame of the machine, on which the lever, K, is pivoted, and this lever, K, is provided with an adjustable dog, which is adjusted to engage with the teeth of the toothed segment, P, to hold said lever, K, and connections at any position to which they may be adjusted. By adjusting the lever, K, downward, the pivotal cross beam, J, cross bars, H, and springs, G, secured to the latter, are pressed downward, and said springs, G, being secured at one end to the coupling, F, (to which one end of the teeth, E, are also secured) as the lever, K, is adjusted downward, the cross beam, J, and cross bars, H, connected therewith, press on the teeth, E, to make a deeper cut in the ground, or to increase the rigidity of the teeth therein, the opposite result being the case when adjusting the lever, K, upward. So that, the teeth, E, being pivotally secured to the axle or spindle, B, and the cross beam, J, being pivotally secured to the lever, K, and to the cross bars, H, a pivotal cross beam is formed, which permits the teeth, E, to adapt themselves to uneven or inclined ground, as shown in Fig. 1; at the same time, the cross beam is the medium through which pressure is applied to both of the cross bars and teeth, E, attached thereto, thereby giving this cross beam, J, the two-fold function, that of a pressure beam, to regulate the rigidity of the teeth in the ground, as well as a pivotal cross beam to automatically adapt the teeth to uneven or inclined land.

Having thus described my invention, I claim—

1. The combined pivotal and pressure cross beam, J, pivotally secured to the lever, K, in combination with, and pivotally secured to the cross bars, H, the springs, G, the teeth, E, the couplings, F, and the axle, B, substantially as shown and described, and for the purpose specified.

2. The combined pivotal and pressure cross beam, J, pivotally secured to the lever, K, in combination with, and pivotally secured to the cross bars, H, the guards or guides, I, the springs, G, teeth, E, couplings, F, and axle, B, substantially as shown and described, and for the purpose specified.

3. The forked guards or guides, I, to prevent the lateral movement of the teeth, and the cross bar, H, in combination with the coupling, F, pivoted on the axle, B, and the tooth, E, and spring, G, secured to said coupling, substantially as shown and described, and for the purpose specified.

4. The coupling, F', formed with a socket, N, in combination with the wheel, A, formed with a hub, O, fitted to said socket, N, and the axle, B, substantially as shown and described, and for the purpose specified.

5. The coupling, F', formed with a socket, N, spring, G, and tooth, E, in combination with the wheel, A, formed with a hub, O, fitted to said socket, N, and the axle, B, substantially as shown and described, and for the purpose specified.

6. The combined pivotal and pressure cross beam, J, lever, K, cross bars, H, link couplings, R, and, L, and the frame, C, in combination with the wheels, A, the axle, B, the couplings, F, and, F', the latter being formed with a socket,, N, teeth, E, springs, G, and guards or guides, I, substantially as shown and described, and for the purpose specified.

In testimony whereof I affix my signature in the presence of the two undersigned witnesses.

WILLIAM HEWITT.

Witnesses:
P. J. EDMUNDS,
T. EDMUNDS.